US012274962B2

(12) United States Patent
Eisen et al.

(10) Patent No.: US 12,274,962 B2
(45) Date of Patent: Apr. 15, 2025

(54) CONTROL MECHANISM FOR SELF-CLEANING FILTRATION SYSTEMS

(71) Applicant: AMIAD WATER SYSTEMS LTD., Upper Galil (IL)

(72) Inventors: Amir Eisen, Upper Galil (IL); Roi Peled, Upper Galil (IL); Kfir Atias, Ein Ya'akov (IL)

(73) Assignee: Amiad Water Systems LTD., Upper Galil (IL)

( * ) Notice: Subject to any disclaimer, the term of this patent is extended or adjusted under 35 U.S.C. 154(b) by 54 days.

(21) Appl. No.: 16/645,990

(22) PCT Filed: Apr. 2, 2019

(86) PCT No.: PCT/IL2019/050383
§ 371 (c)(1),
(2) Date: Mar. 10, 2020

(87) PCT Pub. No.: WO2019/202582
PCT Pub. Date: Oct. 24, 2019

(65) Prior Publication Data
US 2021/0023482 A1    Jan. 28, 2021

(30) Foreign Application Priority Data
Apr. 15, 2018 (IL) .......................... 258698

(51) Int. Cl.
*B01D 29/64* (2006.01)
*B01D 29/23* (2006.01)
(Continued)

(52) U.S. Cl.
CPC ......... *B01D 29/6453* (2013.01); *B01D 29/23* (2013.01); *B01D 29/606* (2013.01);
(Continued)

(58) Field of Classification Search
None
See application file for complete search history.

(56) References Cited

U.S. PATENT DOCUMENTS

| 1,130,725 A * | 3/1915 | Getts | B01D 33/067 55/296 |
| 1,199,350 A * | 9/1916 | Collin | B01D 29/05 210/414 |

(Continued)

FOREIGN PATENT DOCUMENTS

| CN | 101031346 A | 9/2007 |
| CN | 101196318 A | 6/2008 |

(Continued)

OTHER PUBLICATIONS

Amiad Automatic Filters Filtomat M100-6800 Series; 24 pages (Year: 2009).*

(Continued)

*Primary Examiner* — Robert J Popovics
(74) *Attorney, Agent, or Firm* — Myers Wolin, LLC

(57) ABSTRACT

A control mechanism for self-cleaning filtration systems. One embodiment is a controller for a filtration system that comprises a suction scanner and a screening element having modifiable respective locations therebetween. The controller comprises an input terminal for receiving a relative location signal and additional a differential pressure input terminal. The controller monitors differential pressure and outputs an activation signal after the differential pressure has exceeded a threshold value. The controller outputs a termination signal based on the relative location signal. Another embodiment is a filtration system that comprises: a screening element located within a filtration chamber, and a suction scanner for self-cleaning thereof. A location tracker communicates to a switching mechanism during self-cleaning sessions a signal indicative of a location of the suction scanner with respect (Continued)

to the screening element. The switching mechanism automatically terminates self-cleaning sessions based on the signal.

7 Claims, 4 Drawing Sheets

(51) Int. Cl.
    *B01D 29/60*     (2006.01)
    *B01D 29/68*     (2006.01)

(52) U.S. Cl.
    CPC ......... *B01D 29/684* (2013.01); *B01D 29/688* (2013.01); *B01D 29/6446* (2013.01); *B01D 29/682* (2013.01); *B01D 29/686* (2013.01)

(56) References Cited

U.S. PATENT DOCUMENTS

| | | | | | |
|---|---|---|---|---|---|
| 1,439,706 | A * | 12/1922 | Kneuper | B01D 37/02 | 210/93 |
| 1,944,267 | A * | 1/1934 | Rathbun | B01D 46/682 | 55/327 |
| 1,968,741 | A * | 7/1934 | Burrell | B01D 33/503 | 210/392 |
| 1,987,142 | A * | 1/1935 | Clements, Jr. | B01D 29/6484 | 210/414 |
| 2,173,060 | A * | 9/1939 | Andrews | B01D 29/117 | 210/333.1 |
| 2,275,958 | A * | 3/1942 | Hagel | B01D 29/94 | 210/408 |
| 2,429,417 | A * | 10/1947 | Magill | B01D 29/52 | 210/333.1 |
| 2,652,153 | A * | 9/1953 | Perrault | F16L 55/24 | 210/355 |
| 2,765,048 | A * | 10/1956 | Hersey, Jr. | B01D 46/2403 | 55/294 |
| 2,835,390 | A * | 5/1958 | King | B01D 29/25 | 210/791 |
| 3,074,560 | A * | 1/1963 | Kinney | B01D 33/11 | 210/392 |
| 3,168,033 | A * | 2/1965 | Hansen | B30B 9/067 | 100/179 |
| 3,574,509 | A * | 4/1971 | Zentis | B01D 29/606 | 210/107 |
| 3,635,348 | A * | 1/1972 | Carr | B01D 29/54 | 210/333.1 |
| 3,734,299 | A * | 5/1973 | Akiyama | B01D 29/682 | 210/336 |
| 3,850,802 | A * | 11/1974 | Berger | B01D 29/6423 | 210/447 |
| 3,994,810 | A * | 11/1976 | Schaeffer | B01D 29/54 | 210/333.1 |
| 4,042,504 | A * | 8/1977 | Drori | B01D 29/682 | 210/107 |
| 4,156,651 | A * | 5/1979 | Mehoudar | B01D 29/606 | 210/488 |
| 4,271,018 | A * | 6/1981 | Drori | B01D 29/70 | 210/411 |
| 4,295,963 | A * | 10/1981 | Drori | B01D 29/668 | 210/411 |
| 4,454,033 | A * | 6/1984 | Verduyn | B01D 25/327 | 210/333.1 |
| 4,518,501 | A * | 5/1985 | Lennartz | B01D 29/23 | 210/411 |
| 4,532,036 | A * | 7/1985 | Clifford | B01D 29/688 | 210/167.01 |
| 4,552,655 | A * | 11/1985 | Granot | B01D 29/117 | 210/488 |
| 4,632,757 | A * | 12/1986 | Rosenberg | B01D 29/54 | 210/414 |
| 4,643,828 | A * | 2/1987 | Barzuza | B01D 29/686 | 210/414 |
| 4,692,247 | A * | 9/1987 | Orlans | B01D 29/117 | 210/488 |
| 4,702,847 | A * | 10/1987 | Fux | B01D 29/52 | 210/411 |
| RE32,537 | E * | 11/1987 | Drori | B01D 29/114 | 210/108 |
| 4,740,301 | A * | 4/1988 | Lopez | B01D 61/08 | 210/321.87 |
| 4,780,151 | A * | 10/1988 | Barzuza | B01D 29/684 | 95/278 |
| 4,810,270 | A * | 3/1989 | Terry | B01D 46/71 | 55/525 |
| 4,818,402 | A * | 4/1989 | Steiner | B01D 29/445 | 210/411 |
| 4,859,335 | A * | 8/1989 | Whyte | B01D 29/114 | 210/411 |
| 4,875,913 | A * | 10/1989 | Barzuza | B01D 29/684 | 55/294 |
| 4,898,671 | A * | 2/1990 | Fux | B01D 29/688 | 210/411 |
| 4,906,357 | A * | 3/1990 | Drori | B01D 29/114 | 210/411 |
| 5,074,999 | A * | 12/1991 | Drori | B08B 9/093 | 210/411 |
| 5,087,365 | A * | 2/1992 | Davis | B01D 29/6476 | 210/415 |
| 5,152,891 | A * | 10/1992 | Netkowicz | B01D 29/23 | 55/498 |
| 5,164,079 | A * | 11/1992 | Klein | B01D 35/18 | 210/411 |
| 5,198,111 | A * | 3/1993 | Davis | B01D 29/6484 | 210/414 |
| 5,228,993 | A * | 7/1993 | Drori | B01D 29/684 | 55/294 |
| 5,268,095 | A * | 12/1993 | Barzuza | B01D 33/073 | 210/411 |
| 5,364,539 | A * | 11/1994 | Castagno | B01D 29/60 | 210/791 |
| 5,443,726 | A * | 8/1995 | Steiner | B01D 29/70 | 210/414 |
| 5,514,270 | A * | 5/1996 | Barzuza | B01D 29/70 | 210/411 |
| 5,527,462 | A * | 6/1996 | Davis | B01D 29/6484 | 210/414 |
| 5,587,074 | A * | 12/1996 | Lynch | B01D 29/23 | 210/411 |
| 5,595,655 | A * | 1/1997 | Steiner | B01D 29/688 | 210/414 |
| 5,632,903 | A * | 5/1997 | Caracciolo, Jr. | B01D 29/117 | 210/411 |
| 5,733,464 | A * | 3/1998 | Bunch | B01D 29/15 | 210/791 |
| 5,792,373 | A * | 8/1998 | Bennick | B01D 29/114 | 210/798 |
| 5,804,072 | A * | 9/1998 | Yang | B01D 29/606 | 210/111 |
| 5,824,229 | A * | 10/1998 | Larkey | B01D 29/682 | 210/791 |
| 5,855,794 | A * | 1/1999 | Caracciolo, Jr. | B01D 33/11 | 210/791 |
| 5,871,652 | A * | 2/1999 | England | B01D 29/52 | 210/791 |
| 6,001,242 | A * | 12/1999 | England | B01D 29/52 | 210/194 |
| 6,267,879 | B1 * | 7/2001 | Gil | B01D 29/606 | 210/414 |
| 6,337,013 | B1 * | 1/2002 | Koopmans | B01D 29/54 | 210/450 |
| 6,443,312 | B1 * | 9/2002 | Racine | B01D 29/118 | 210/414 |
| 6,475,397 | B1 * | 11/2002 | Sanderson | B01D 29/665 | 210/791 |
| 6,959,818 | B2 * | 11/2005 | Olson | B01D 29/688 | 210/411 |
| 7,055,699 | B2 * | 6/2006 | Takatsuka | B01D 29/682 | 210/414 |

(56) References Cited

U.S. PATENT DOCUMENTS

| | | | | |
|---|---|---|---|---|
| 7,083,735 B2* | 8/2006 | Laing | B01D 29/902 | 210/791 |
| 7,097,046 B2* | 8/2006 | Calabrese | B01D 29/682 | 210/392 |
| 7,174,273 B2* | 2/2007 | Goldberg | B01D 35/143 | 702/182 |
| 7,297,265 B1* | 11/2007 | Booth | B01D 29/688 | 210/411 |
| 8,028,841 B2* | 10/2011 | Olson | B01D 29/117 | 210/411 |
| 8,496,117 B2* | 7/2013 | Leath, III | B01D 33/463 | 210/396 |
| 8,501,004 B2* | 8/2013 | Lee | C02F 1/325 | 210/90 |
| 8,524,075 B1* | 9/2013 | Quintel | B01D 29/688 | 210/791 |
| 8,678,199 B2* | 3/2014 | Keller | B01D 29/54 | 210/411 |
| 8,679,335 B1* | 3/2014 | Dufort | B01D 29/6438 | 210/791 |
| 8,821,720 B2* | 9/2014 | Lee | B01D 29/117 | 210/414 |
| 8,828,223 B2* | 9/2014 | Savage | B30B 9/047 | 210/DIG. 8 |
| 8,980,103 B2* | 3/2015 | Lee | B01D 29/682 | 210/411 |
| 9,211,489 B2* | 12/2015 | Riggers | B08B 5/04 | |
| 9,314,718 B2* | 4/2016 | Mauda | B01D 29/23 | |
| 9,327,218 B2* | 5/2016 | Linster | B01D 29/6484 | |
| 9,347,570 B2* | 5/2016 | Shamir | B01D 29/114 | |
| 9,415,332 B2* | 8/2016 | Shaw | B01D 29/64 | |
| 9,532,681 B2* | 1/2017 | Savage | B30B 9/047 | |
| 9,545,588 B2* | 1/2017 | Lee | B63B 13/00 | |
| 9,550,557 B2* | 1/2017 | Lee | B01D 29/117 | |
| 9,561,454 B2* | 2/2017 | Browning | B01D 29/035 | |
| 9,616,363 B2* | 4/2017 | Osman Oguz | B01D 29/94 | |
| 9,669,335 B2* | 6/2017 | Takahashi | B01D 29/23 | |
| 9,675,916 B2* | 6/2017 | Clements | B01D 35/12 | |
| 9,901,850 B2* | 2/2018 | Zur | B01D 29/68 | |
| 10,046,253 B2* | 8/2018 | Takahashi | B01D 29/23 | |
| 10,058,806 B2* | 8/2018 | Tange | C02F 1/008 | |
| 10,080,983 B2* | 9/2018 | Hampton | B01D 29/661 | |
| 10,233,092 B2* | 3/2019 | Tange | C02F 1/008 | |
| 10,245,531 B2* | 4/2019 | Steiner | B01D 29/688 | |
| 10,433,674 B2* | 10/2019 | Savage | B30B 9/067 | |
| 10,632,403 B2* | 4/2020 | Lee | B01D 29/688 | |
| 10,646,801 B2* | 5/2020 | Tameroglu | B01D 29/6415 | |
| 10,688,418 B2* | 6/2020 | Joshi | B01D 29/6438 | |
| 10,688,419 B2* | 6/2020 | Browning | B01D 29/688 | |
| 10,737,950 B2* | 8/2020 | Bennett | C02F 1/008 | |
| 10,751,764 B2* | 8/2020 | Dagan | B08B 5/04 | |
| 10,905,982 B2* | 2/2021 | Holmen | B01D 29/686 | |
| 11,083,985 B2* | 8/2021 | Nellis | B01D 46/00 | |
| 11,278,826 B2* | 3/2022 | Deutschmeyer | B01D 29/688 | |
| 11,896,989 B2* | 2/2024 | Ferren | B05B 12/006 | |
| 12,083,543 B2* | 9/2024 | Ferren | B05B 15/52 | |
| 12,138,566 B2* | 11/2024 | Takahashi | B01D 29/6484 | |
| 2002/0008068 A1* | 1/2002 | Anderson | B01D 29/684 | 210/741 |
| 2004/0238435 A1* | 12/2004 | Olson | B01D 29/682 | 210/413 |
| 2006/0043014 A1* | 3/2006 | Takatsuka | B01D 29/15 | 210/411 |
| 2006/0259273 A1* | 11/2006 | Goldberg | B01D 37/046 | 702/182 |
| 2007/0199885 A1* | 8/2007 | Shmuel | B01D 29/688 | 210/427 |
| 2008/0047885 A1* | 2/2008 | Shiekelmacher | B01D 29/686 | 210/107 |
| 2008/0272058 A1* | 11/2008 | Olson | B01D 29/117 | 210/741 |
| 2008/0282905 A1* | 11/2008 | Savage | B30B 9/047 | 426/438 |
| 2009/0050582 A1* | 2/2009 | Gil | B01D 29/114 | 210/411 |
| 2011/0100885 A1* | 5/2011 | Lee | C02F 1/325 | 210/85 |
| 2011/0226681 A1* | 9/2011 | Lee | C02F 1/325 | 210/90 |
| 2011/0303591 A1* | 12/2011 | Lee | B01D 29/688 | 210/106 |
| 2011/0303615 A1* | 12/2011 | Lee | C02F 1/325 | 210/741 |
| 2012/0111788 A1* | 5/2012 | Leath, III | B01D 33/11 | 210/409 |
| 2012/0255915 A1* | 10/2012 | Linster | B01D 29/665 | 210/323.1 |
| 2013/0026111 A1* | 1/2013 | Gil | B01D 29/117 | 210/791 |
| 2013/0087495 A1* | 4/2013 | Riggers | B01D 46/04 | 210/415 |
| 2013/0168330 A1* | 7/2013 | Strasser | B01D 37/02 | 210/791 |
| 2013/0270163 A1* | 10/2013 | Zur | B01D 29/117 | 210/138 |
| 2013/0299014 A1* | 11/2013 | Ben-Horin | B01D 29/908 | 137/544 |
| 2013/0306546 A1* | 11/2013 | Cartarius | B01D 29/117 | 210/411 |
| 2014/0021125 A1* | 1/2014 | Luo | B01D 29/688 | 210/332 |
| 2014/0097143 A1* | 4/2014 | Clements | B01D 35/12 | 210/741 |
| 2014/0097145 A1* | 4/2014 | Browning | B01D 29/688 | 210/357 |
| 2014/0231320 A1* | 8/2014 | Lee | B01D 29/682 | 210/108 |
| 2014/0238911 A1* | 8/2014 | Lee | B01D 29/52 | 210/108 |
| 2014/0246378 A1* | 9/2014 | Lee | B01D 29/117 | 210/741 |
| 2014/0305862 A1* | 10/2014 | Zur | B01D 29/684 | 210/333.01 |
| 2014/0366493 A1* | 12/2014 | Takahashi | B01D 29/117 | 210/411 |
| 2015/0053628 A1* | 2/2015 | Dale | B08B 7/02 | 210/411 |
| 2015/0060350 A1* | 3/2015 | Savage | B30B 9/047 | 210/416.5 |
| 2015/0129483 A1* | 5/2015 | Mauda | B01D 29/688 | 210/411 |
| 2015/0210564 A1* | 7/2015 | Inoue | B63J 4/002 | 250/438 |
| 2016/0067636 A1* | 3/2016 | Lee | C02F 1/004 | 210/741 |
| 2016/0096124 A1* | 4/2016 | Marco | B01D 29/682 | 210/411 |
| 2016/0097247 A1* | 4/2016 | Marco | B01D 29/688 | 166/308.1 |
| 2016/0214039 A1* | 7/2016 | Tameroglu | B01D 29/6446 | |
| 2016/0236122 A1* | 8/2016 | Tange | B01D 33/806 | |
| 2016/0250572 A1* | 9/2016 | Takahashi | B01D 29/6423 | 210/408 |
| 2016/0310876 A1* | 10/2016 | Ben-Horin | B01D 35/16 | |
| 2017/0014736 A1* | 1/2017 | Osman Oguz | B01D 29/23 | |
| 2017/0072343 A1* | 3/2017 | Cao | B01D 29/688 | |
| 2017/0095117 A1* | 4/2017 | Savage | B30B 9/047 | |
| 2017/0349450 A1* | 12/2017 | Tange | C02F 1/008 | |
| 2019/0381430 A1* | 12/2019 | Lingen | B01D 29/23 | |
| 2019/0388808 A1* | 12/2019 | Takahashi | B01D 29/11 | |
| 2021/0023482 A1* | 1/2021 | Eisen | B01D 29/23 | |
| 2021/0362080 A1* | 11/2021 | Granot | B01D 29/94 | |
| 2022/0047973 A1* | 2/2022 | Eisen | B01D 29/6453 | |
| 2022/0062939 A1* | 3/2022 | Ferren | B01D 29/6423 | |

FOREIGN PATENT DOCUMENTS

| | | |
|---|---|---|
| CN | 202762158 U | 3/2013 |
| DE | 102014012032 A1 | 2/2016 |

(56) References Cited

FOREIGN PATENT DOCUMENTS

| | | | | |
|---|---|---|---|---|
| EP | 2767319 | A1 | 8/2014 | |
| ES | 2385084 | A1 | 7/2012 | |
| WO | WO-0112293 | A1 * | 2/2001 | ............ B01D 29/682 |
| WO | WO-2005110576 | A1 * | 11/2005 | ............ B01D 29/688 |
| WO | WO-2006080653 | A1 * | 8/2006 | ............ B01D 29/688 |
| WO | WO-2015130253 | A1 * | 9/2015 | ............. B01D 29/94 |
| WO | WO-2018167781 | A1 * | 9/2018 | ............ B01D 29/606 |
| WO | WO-2019202582 | A1 * | 10/2019 | ............. B01D 29/23 |
| WO | WO-2021086277 | A1 * | 5/2021 | ............. B01D 29/58 |

OTHER PUBLICATIONS

Amiad Filtration Solutions Technical Specification; 6 pages Aug. 3, 2009. (Year: 2009).*

Amiad Product Overview, 12 pages Nov. 2010. (Year: 2010).*

Galcon AMC Flushing Controller User Guide; 48 pages; 2016. (Year: 2016).*

Amiad Spare Parts List; Dec. 2016; 157 pages. (Year: 2016).*

Amiad Irrigation Catalogue; 42 pages; 2009. (Year: 2009).*

Amiad AMC Flushing Controllers User Guide; 46 pages; Sep. 2013. (Year: 2013).*

Amiad Water Systems Spare Parts Price List 2015 for M100 Filter; 71 pages. (Year: 2015).*

Amiad Water Systems Ltd. ADI-P Smartphone Operated Controller for Filtration Systems; 21 pages; May 2020. (Year: 2020).*

FILTOMAT M100; 3 pages; Undated. (Year: U) (Year: U) (Year: U).*

Amiad Water Systems 2016 Irrigation Product Price list; 40 pp. (Year: 2016).*

ADI-P—Centralina per filtri azionata via smartphone; Sep. 2018; 18 pp. (Year: 2018).*

Office Action issued by the China National Intellectual Property Administration for corresponding Chinese Patent Application No. 201980025362.7, dated Nov. 2, 2021, with an English machine-generated translation attached.

Office Action issued by the China National Intellectual Property Administration for Chinese Patent Application No. 201980025362.7, dated Oct. 17, 2022.

Supplementary partial European search report and search opinion issued by the European Patent Office for corresponding European Patent Application No. 19787661.8, dated Aug. 20, 2021.

International Search Report with written opinion issued for corresponding International Patent Application No. PCT/IL2019/050383 mailed on Jun. 25, 2019.

Non-final Office Action issued for U.S. Appl. No. 17/511,004, dated Jun. 21, 2024.

* cited by examiner

CONTROL MECHANISM FOR SELF-CLEANING FILTRATION SYSTEMS

CROSS-REFERENCE TO RELATED APPLICATION

This application claims the benefit of Israeli Patent Application No. 258,698 filed Apr. 15, 2018, entitled "CONTROL MECHANISM FOR SELF-CLEANING FILTRATION SYSTEM", which is hereby incorporated by reference in its entirety without giving rise to disavowment.

TECHNICAL FIELD

The present disclosure relates to the field of automated self-cleaning of filtration systems, more specifically to control systems for automatic self-cleaning of filtration systems.

BACKGROUND

One factor which influences the efficiency of self-cleaning of filtration systems is the amount of fluid, e.g. fresh water in a water filtration system, wasted in performing the self-cleaning (as a percentage of the total amount of fluid flowing through the system).

Excessive waste of self-cleaning water may result from unnecessary prolongation of the self-cleaning session beyond the required for effective cleaning of the screening member.

The time duration for cleaning a screening member to its full extent, depends on unstable factors such as the pressure of water in the water supply system during the self-cleaning, amount of filtride and residue on the screening member, and properties thereof. The water pressure may be unpredictable because it may depend on factors that may vary in real-time, e.g. the water consumption rate from the system during the self-cleaning session, and the number of filters which happen to undergo backflush simultaneously. Similarly, the amount and properties of the filtride may also be unpredictable, depending on the raw fluid that is being filtered and particles therein.

In some cases, a controller of the self-cleaning filtration system may be configured to activate the cleaning process for a predetermined time duration. Setting the time duration may be challenging, as too short duration may be insufficient for full extent cleaning on the one hand, and on the other, excessively long duration causes undue waste of fluid.

It is therefore among the objects of the following disclosure to provide for optimization of the duration of automatic self-cleaning sessions in filtration systems.

BRIEF SUMMARY

It is an object of the presently disclosed subject matter to provide for timely termination of self-cleaning sessions in filtration systems in which screening elements (filters) are cleaned by scanners (which scan the screen by relative motion between the screening element and a respective scanner), for minimizing waste of self-cleaning fluids and for avoiding termination of a self-cleaning session before completion of scanning the screening element by the scanner.

A first solution according to the presently disclosed subject matter is to determine whether a change in the respective position between the screening element and the scanner (resulting from the relative motion between the scanner and the screening element) has reached an end, wherein the determination is based at least on a signal free from real-time variations in parameters (e.g. pressure, flow-rate, transparency) of the self-cleaning fluid.

A first broad aspect of the presently disclosed subject matter is filtration systems comprising a location tracker. The location tracker is a device configured to generate during the self-cleaning session a signal indicative of a location of the scanner with respect to the screening element.

In various embodiments according to the presently disclosed subject matter, a filtration system comprises: a filtration chamber; a screening element located within the filtration chamber; a suction scanner for self-cleaning the screening element by suctioning fluid through the screening element upon activation of a self-cleaning session; a switching mechanism configured to automatically terminate the self-cleaning session when a condition is met; and a location tracker configured to communicate to the switching mechanism during the self-cleaning session a signal indicative of a location of the suction scanner with respect to the screening element, wherein the switching mechanism is configured to determine whether the condition is met based on said signal.

In various embodiments of the presently disclosed subject matter, the location tracker comprises a moving body coupled to a moving part of the suction scanner for moving outside the filtration chamber in an environment isolated from fluid content of the filtration chamber, said moving corresponds to a linear motion of the moving part of the suction scanner within the filtration chamber.

In various embodiments of the presently disclosed subject matter, the moving body comprises a piston linearly movable within a cylinder.

In various embodiments of the presently disclosed subject matter, the cylinder is coupled to a fluid source for filling the cylinder with a predetermined amount of fluid prior to the activation of the self-cleaning session.

In various embodiments of the presently disclosed subject matter, the switching mechanism comprises at least one pressure detector for detecting a change in the pressure within the cylinder resulting from the state of motion of the piston during a self-cleaning session.

A second solution according to the presently disclosed subject matter is to provide the filtration system with electronic controller, and to communicate the signals generated by the location tracker to the electronic controller, wherein the electronic controller is configured to determine whether a cleaning session is to be terminated, based on at least the signals generated by the location tracker.

Accordingly, in various embodiments of the presently disclosed subject matter, the switching mechanism comprises an electronic controller, wherein the electronic controller comprises an input terminal in communication with an output of said pressure detector.

In various embodiments of the presently disclosed subject matter, the electronic controller further comprises at least one input terminal for monitoring a real-time difference between a first and a second pressure.

In various embodiments of the presently disclosed subject matter, the at least one input terminal comprises second and third input terminals, wherein the second input terminal is in communication with an output of a pressure sensor configured to monitor a pressure of unfiltered fluid entering the filtration chamber, wherein the third input terminal is in communication with an output of a pressure sensor configured to monitor a pressure of filtered fluid exiting the filtration chamber.

In various embodiments of the presently disclosed subject matter, the electronic controller is configured to monitor the differential pressure between the pressure monitored by the second pressure sensor and the pressure monitored by the third pressure sensor, to initiate a self-cleaning session after the differential pressure has exceeded a predetermined threshold value, and to terminate the self-cleaning session upon detection of an expected change in the pressure within the cylinder by the pressure detector.

In various embodiments of the presently disclosed subject matter, the switching mechanism comprises a signaling device configured to alter a signal in an output of the signaling device when the moving body reaches a predetermined position with respect to the signaling device during a self-cleaning session.

In various embodiments of the presently disclosed subject matter, the moving body is configured to touch an actuator of the signaling device when the moving body reaches the predetermined position.

In various embodiments of the presently disclosed subject matter, the signaling device comprises at least one of a photosensor an electric-field sensor or magnetic field sensor for determining whether the moving body has reached the predetermined location.

In various embodiments of the presently disclosed subject matter, the switching mechanism comprises an electronic controller, wherein the electronic controller comprises an input terminal in communication with an output of a signaling device, wherein the signaling device is configured to alter a signal in the output of the signaling device when the moving body reaches a predetermined position with respect to the signaling device during a self-cleaning session.

A second broad aspect of the presently disclosed subject matter is electronic controllers for initiating and terminating self-cleaning sessions in filtration systems. According to various embodiments of the presently disclosed subject matter, an electronic controller for initiating and terminating self-cleaning sessions is provided as a part of a filtration system, the filtration system comprises a suction scanner and a screening element having modifiable respective locations therebetween, and the electronic controller comprises: a first input terminal for receiving a signal indicative of a location of the suction scanner with respect to the screening element; at least one additional input terminal for receiving a signal indicative of a differential pressure between a first fluid pressure and a second fluid pressure; wherein the electronic controller is configured to monitor the differential pressure between the first and second fluid pressures and to output an activation signal after the differential pressure has exceeded a predetermined threshold value; and wherein the electronic controller is configured to output a termination signal based on the signal indicative of the location of the suction scanner with respect to the screening element.

In various embodiments of the presently disclosed subject matter, said at least one additional input terminal comprises a second terminal for receiving a signal indicative of the second fluid pressure, wherein said at least one additional input terminal further comprises a third terminal for receiving a signal indicative of the third fluid pressure.

In various embodiments of the presently disclosed subject matter, the electronic controller further comprises a timer, and is configured to output the activation signal as a function of both a count of time and the differential pressure.

In various embodiments of the presently disclosed subject matter, the electronic controller further comprises a counter for counting the number of outputted activation signals and configured to output the activation signal as a function of both the differential pressure and a count of the number of outputted activation signals.

In various embodiments of the presently disclosed subject matter, the electronic controller further comprises a timer, and is configured to output the termination signal as a function of both the signal indicative of the location of the suction scanner with respect to the screening element and a time lapse since a predetermined event.

In various embodiments of the presently disclosed subject matter, the electronic controller is configured to output the termination signal taking the signal indicative of the location of the suction scanner with respect to the screening element reached a predetermined value as the event.

In various embodiments of the presently disclosed subject matter, the electronic controller is configured to output the termination signal taking a recent outputting of activation signal as the event.

In various embodiments of the presently disclosed subject matter, the signal indicative of the location of the suction scanner with respect to the screening element is a signal indicative of a third fluid pressure.

In various embodiments of the presently disclosed subject matter, the third fluid pressure is affected by a pressure exerted by a piston causing a relative linear movement between the suction scanner and the screening element.

In various embodiments of the presently disclosed subject matter, the first fluid pressure is a monitored at an inlet of a filtration chamber in the filtration system, wherein the second fluid pressure is monitored at an outlet of the filtration chamber, whereby the first fluid pressure and the second fluid pressure are affected by fluid passing through the screening element, thereby indicating effectiveness of filtration of the screening element, wherein the third fluid pressure is measured at a location that is separated from and having no fluid communication with the inlet and the outlet of the filtration chamber.

A third broad aspect of the presently disclosed subject matter is a method for controlling self-cleaning sessions in a filtration system having a filtration chamber. In various embodiments of the presently disclosed subject matter, the method comprises: while a self-cleaning session is performed, obtaining a third fluid pressure, wherein the third fluid pressure is measured at a location that is separated from and having no fluid communication with an inlet and an outlet of the filtration chamber; in response to the third fluid pressure being below a predetermined threshold value, causing the self-cleaning session to stop.

In various embodiments of the presently disclosed subject matter, the method further comprises: obtaining a differential pressure, wherein the differential pressure is a difference between a first fluid pressure and a second fluid pressure, wherein the first fluid pressure is a pressure measured at the inlet of the filtration system, wherein the second fluid pressure is a pressure measure at the outlet of the filtration chamber after fluid passing through a filtering element; in response to a determination that the differential pressure is above a first threshold, causing the self-cleaning session to commence.

In various embodiments of the presently disclosed method, said causing the self-cleaning session to commence comprises: opening a drain valve and switching a latch valve, wherein said causing the self-cleaning session to stop comprises: closing the drain valve and switching the latch valve.

In various embodiments of the presently disclosed method, said obtaining the differential pressure comprising obtaining the first fluid pressure and the second fluid pressure; and computing the differential pressure.

In various embodiments of the presently disclosed method, the first fluid pressure is determined by a first pressure sensor and having fluid communication with the inlet of the filtration system; wherein the second fluid pressure is determined by a second pressure sensor having fluid communication with the outlet of the filtration chamber; and wherein the third fluid pressure is determined by a third pressure sensor having fluid communication with the location that is separated from and having no fluid communication with the inlet and the outlet of the filtration chamber.

In various embodiments of the presently disclosed subject matter in which the self-cleaning sessions are performed by a suction scanner scanning the filtering element, the method comprises: while a self-cleaning session is performed, obtaining a third fluid pressure, wherein the third fluid pressure is measured at a location that is separated from and having no fluid communication with an inlet and an outlet of the filtration chamber; computing, based on the third fluid pressure, a location of the suction scanner with respect to the filtering element; determining, based on the location of the suction scanner, that the scanning is complete; and in response to the scanning being complete, causing the self-cleaning session to stop.

In various embodiments of the presently disclosed subject matter, the method further comprises: obtaining a differential pressure, wherein the differential pressure is a difference between a first fluid pressure and a second fluid pressure, wherein the first fluid pressure corresponds to the pressure at the inlet of the filtration system, wherein the second fluid pressure corresponds to the pressure at the outlet of the filtration chamber of fluid passed through a filtering element; in response to a determination that the differential pressure is above a first threshold, causing the self-cleaning session to commence.

In various embodiments of the presently disclosed method, said causing the self-cleaning session to commence comprises: opening a drain valve and switching a latch valve, wherein said causing the self-cleaning session to stop comprises: closing the drain valve and switching the latch valve.

DESCRIPTION OF THE FIGURES

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION OF THE FIGURES

Figure 1A:
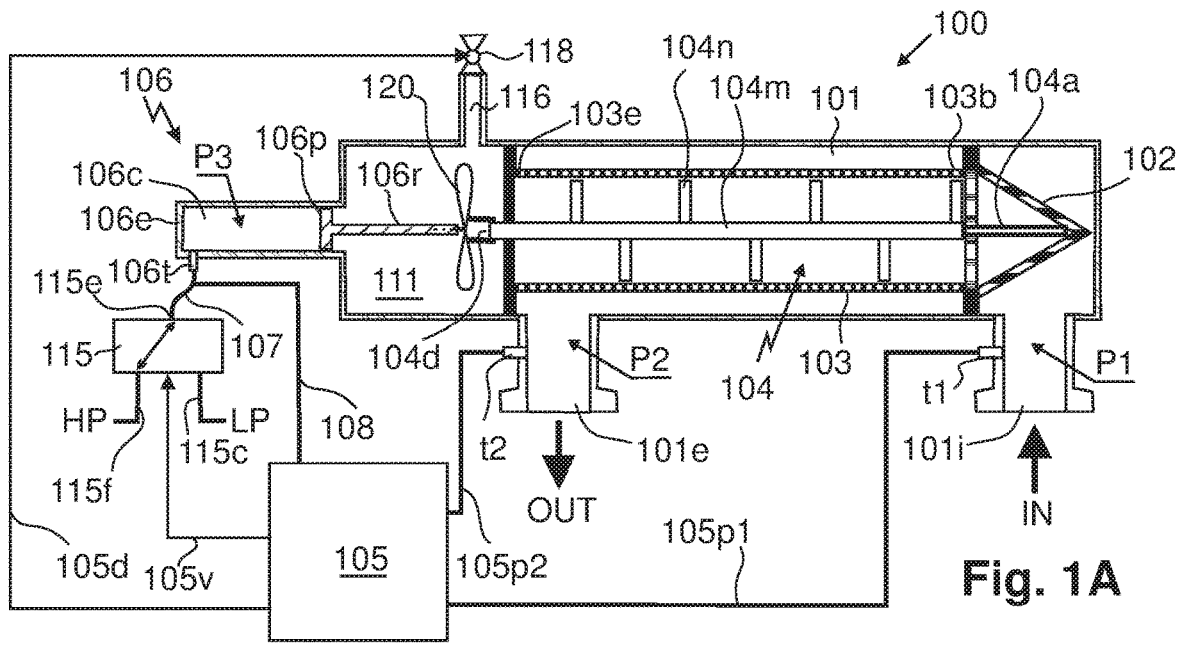
FIG. 1A illustrates a schematic of an exemplary embodiment of a self-cleaning filtration system according to some embodiments of the presently disclosed subject matter, the system is shown during its filtration mode of operation.
Figure 1B:
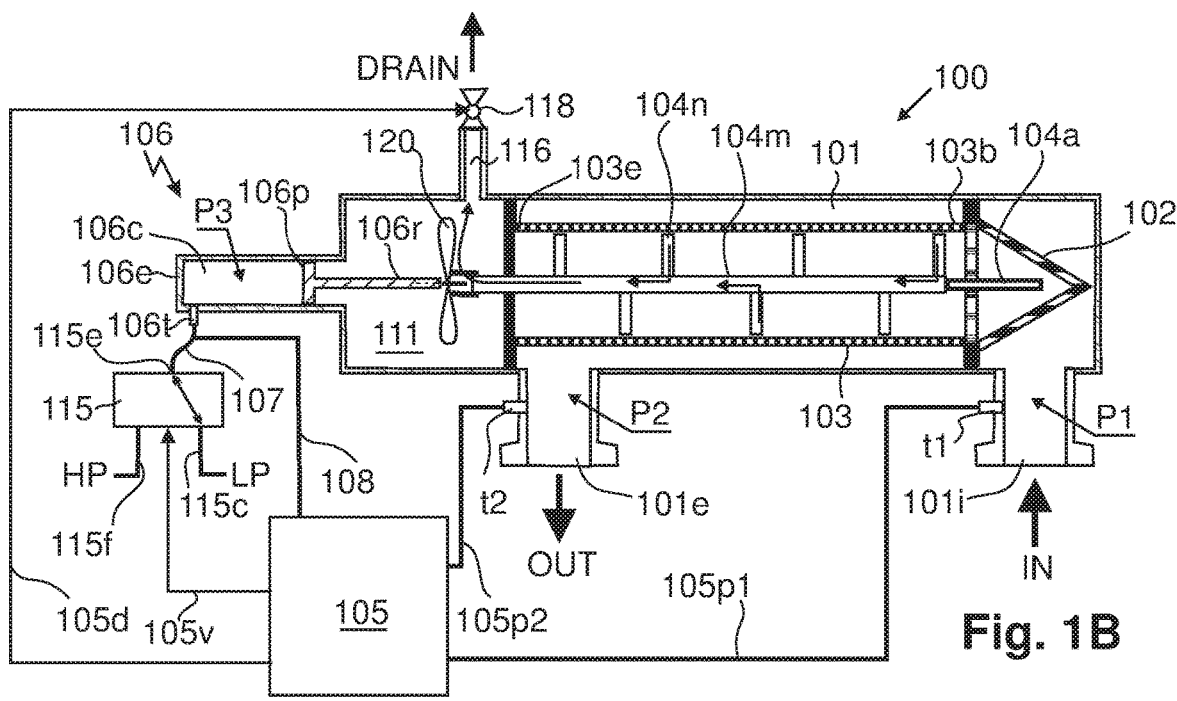
FIG. 1B illustrates the system of FIG. 1A at the beginning of a self-cleaning operation mode.
Figure 1C:
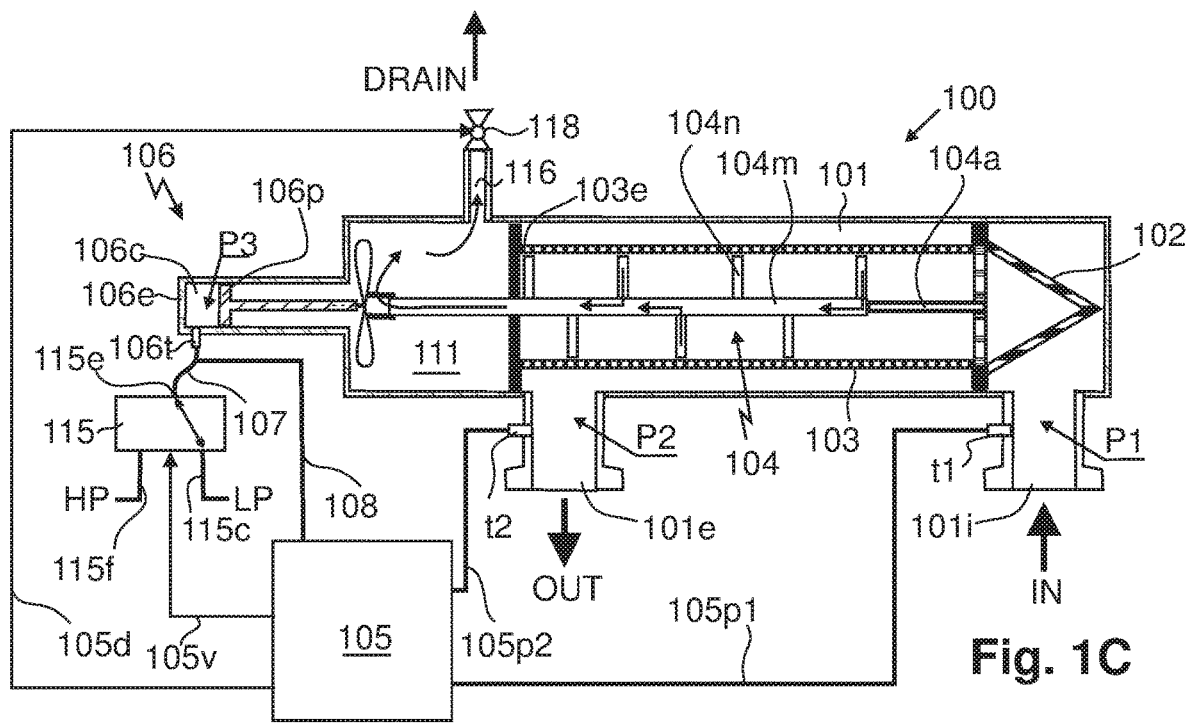
FIG. 1C illustrates the system of FIG. 1A at the end of a self-cleaning session, shortly before it resets and takes the filtration-mode position shown in FIG. 1A.

FIG. 1A-1C illustrate three respective schematics of an exemplary embodiment of a filtration system 100 according to some embodiments of the presently disclosed subject matter, in three situations which may normally occur during the operation cycle of the system. FIG. 1A illustrates the system during its filtration mode of operation. FIG. 1B illustrates the system at the beginning of a self-cleaning operation mode (referred to also as "self-cleaning session"). FIG. 1C illustrates the system at the end of a self-cleaning session, shortly before it resets and takes the filtration-mode position shown in FIG. 1A.

The filtration system 100 comprises a filtration chamber 101, a pre-filter (coarse screen) 102, a screening element (fine screen) 103 located within the filtration chamber 101, a suction scanner 104 comprising a main-tube 104*m* and at least one nozzle 104*n* for self-cleaning the screening element by suctioning fluid through the screening element upon activation of a self-cleaning session, and a switching mechanism configured to terminate the self-cleaning session when a condition is met.

In various embodiments of the presently disclosed subject matter, one of the suction scanner 104 and the screening element 103 is configured to move linearly with respect to the other, during a self-cleaning session. The relative linear motion between the scanner and the screen (which, as a matter of design, may be combined with rotational motion between the suction scanner 104 and the screening element 103) allows for scanning and cleaning by suction the screening element to its entire extent. The relative motion results also with a predetermined linear offset of positions between these two elements when their relative position in the moment before activation of a self-cleaning session is compared to their relative position in the moment of termination of a successful self-cleaning.

Partial linear offset between their relative positions in the moment of activation of a self-cleaning session and in the moment of termination of a self-cleaning session may occur in case of premature termination of the self-cleaning, i.e. before a full-extent scanning. Premature termination may be desired e.g. in case the self-cleaning session exceeds a predefined maximal time limit.

In various embodiments of the presently disclosed subject matter, the linearly moving part of the suction scanner is a main-tube 104*m* of the suction scanner through which the suctioned dirt is communicated to a draining port 116. In some embodiments of the presently disclosed subject matter, the suction scanner is 104 is stationary with respect to the filtration chamber. In such embodiments the screening element 103 is configured to move linearly with respect to the filtration chamber and the suction scanner, thereby constituting the moving part of the suction scanner, to which a moving body of the location tracker may be coupled for the purpose of monitoring the respective linear offset of positions between the suction scanner and the screening element.

In various embodiments of the presently disclosed subject matter, for the condition to be met, a predetermined change in a signal indicative of the respective linear offset between the screening element 103 and the suction scanner 104 need to be recorded, with, without, or as an alternative to additional criteria to be met.

In other various embodiments of the presently disclosed subject matter, for the condition to be met a value calculated based on a signal indicative of a respective linear motion between the screening element 103 and the suction scanner 104 need to exceed a predetermined threshold value indicative of the respective linear offset between the screening element 103 and the suction scanner 104, with, without, or as an alternative to additional criteria to be met.

The signal to be used in determining whether the condition is met, may be generated by a location tracker 106 having a moving body 106p coupled to a moving part 104m of the suction scanner 104, for moving outside the filtration chamber 101 in an environment 106c isolated from fluid content of the filtration chamber, wherein said moving corresponds to a motion of the moving part of the suction scanner within the filtration chamber.

In various embodiments of the presently disclosed subject matter, the termination of the cleaning session may be based on additional criteria. The additional criteria to be met for automatic termination of the self-cleaning session may include one or more of the following: (i) a lapse of a predetermined time from the time of recordation of the predetermined change in the signal; (ii) a lapse of a predetermined time from the activation of a recent self-cleaning session; (iii) a pressure differential between a first pressure P1 and a second pressure P2 measured respectively from opposite sides (upstream and downstream) of the screening element 103 has reached a predetermined value; (iv) a predetermined change in a pressure differential between a first pressure P1 and a second pressure P2 measured respectively from opposite sides of the screening element 103 has been recorded.

In the illustrated embodiment, the signal by which the offset between the screening element 103 and the suction scanner 104 is revealed, is a fluid pressure P3 measurable in an outlet port 106t of the location-tracker 106.

In the illustrated embodiment, the switching mechanism comprises an electronic controller 105 coupled to an electromechanical latch valve 115. The latch valve 115 has a first state in which a fluid-outlet 115e is in fluid communication with a first fluid inlet 115f, and a second state in which the fluid outlet 115e is in fluid communication with a second fluid inlet 115c. Additionally or alternatively, other forms of valves may be utilized, such as an AC valve, DC valve, DC latch valve, solenoid valve, or the like.

The outlet 115e of the latch valve 115 is in fluid communication with an inlet port of the location-tracker 106t through a pipe-line 107.

The location tracker 106 comprises a piston 106p, movable within a cylinder 106c. The piston is coupled to and is linearly comoving with a linearly moving part 104m of the suction scanner 104.

In various embodiments of the presently disclosed subject matter, a draining compartment 111 separates between the filtration chamber 101 and the cylinder 106c. A proximal end of the draining compartment 111 is connected to an end of the filtration chamber 101 near an end portion 103e of the screening element 103 to be scanned by the suction scanner 104 closely to the termination of the self-cleaning session. The cylinder 106c is connected to a distal end of the draining compartment 111, opposite said proximal end. A draining-opening 104d of the suction scanner located at an end of a main tube 104m of the suction scanner 104 is opened to the draining compartment. In various embodiments of the presently disclosed subject matter, a turbine 120 configured to rotate the suction scanner by means of kinetic energy extracted from the flow of draining fluid suctioned by the scanner, is housed by the draining compartment 111 and is connected to a top end of the suction-scanner's main tube 104m.

One or more suction nozzles 104n of the suction scanner may extend between the main-tube 104m of the suction scanner and the internal surface of the screening element 103, such that intake-openings of the nozzles touch or nearly-touch the porous inner surface of the screening element 103. In some exemplary embodiments, the nozzles may be angularly or linearly spaced along the main-tube 104m, in a design guaranteeing full coverage of the screening element 103 during a full extent suction-scanning. In some exemplary embodiments, suction scanner 104 may be configured to move the suction nuzzles 104n in a helical-like trajectory while scanning the screening element 103. Additionally or alternatively, suction nozzles 104n may be shaped as a disk so as to concurrently engage an entire inner circumference of a cylindrical portion of the screening element 103. In such an embodiment, suction scanner 104 may or may not rotate about its axis. Linear movement of the suction nozzles 104n may provide a full scanning of the filter element 103. In some exemplary embodiments the main tube 104m of the suction scanner may be provided with a single longitudinally extending nozzle having an intake opening elongated parallel to the main tube along a certain extent of the screening element, wherein scanning of the entire extent of the screening element may be achieved by the intake opening of the single nozzle following a helical trajectory.

In various embodiments of the presently disclosed subject matter, the draining compartment 111 comprises a draining port 116 in fluid communication with a drain valve 118. In various embodiments of the presently disclosed subject matter, the drain valve 118 is connected to a draining environment (e.g. a collection tank, or e.g. free atmosphere) through evacuation tube (not illustrated).

In various embodiments of the presently disclosed subject matter, activation of self-cleaning includes opening the draining valve 118. The draining valve is in fluid communication with the inner porous surface of the screening element 103 through the draining port 116, the draining compartment 111, and the main tube 104m of suction scanner 104 (which its exit-opening 104d is opened in the draining compartment). Since the fluid pressure in the filtration chamber 101 is greater than the pressure in the draining environment to which the drain valve 118 is open, fluid from the filtration chamber may be suctioned into the intake openings of the nozzles of the suction scanner 104, thereby cleaning the screening element 103 and draining the removed dirt through the main tube 104m, the draining compartment 111, and the drain valve 118.

Once a fluid flow is established through the suction-scanner's main tube 104m, the turbine 120 connected at the top of the main tube starts to rotate due to kinetic energy supplied by the drain flow emerging from the opening 104d at the top of the main tube 104m, such that a screen portion 103b at a first end of the screening element becomes suctioned and cleaned, and linear motion of the scanner 104 may be started, and is to be tracked by the location tracker 106.

For the location to be tracked, the fluid pressure P3 at an end of the cylinder 106c facing a first side of the piston 106p, away from the filtration chamber 101, is communicated to the electronic-controller 105 from the outlet port of the location tracker through a pipe-line 108.

In the illustrated embodiment, the moving part of the suction scanner 104 is the main tube 104m. The piston 106p of the location tracker 106, is coupled to the main tube 104m of the suction scanner 104 by means of a piston-stem 106r.

In various embodiments of the presently disclosed subject matter, the piston stem 106r is pivotably coupled to the suction scanner (in the illustrated embodiment, the piston 106p is coupled to the scanner 104 through the turbine 120, wherein the piston stem 106r has hollow end and the turbine 120 has an axial pin protruding into the hollow of the stem), thereby allowing for free rotation of the suction scanner 104, without rotation of the piston 106p. Thus, the suction scanner 104 and the piston 106p can comove linearly during a suction scanning, while only the suction scanner rotates.

During the filtration mode of operation (FIG. 1A), the latch valve 115 is in said first state. In the first state of the latch valve, the inlet port 115f is connected to the exit port 115e, therefore the valve 115 communicates to the cylinder 106c a high-pressure fluid HP supplied from the latch-valve inlet 115f. The high-pressure fluid is greater than the pressure fluid inside the filtration chamber 101 which presses the piston from its second side (the side of the piston facing the filtration chamber), thus maintains the piston 106p closer to the filtration chamber and full-stroke remotely from the cylinder end 106e, as illustrated by FIG. 1A.

The controller 105 is configured to turn the filtration system 100 into a self-cleaning mode, either manually (e.g. by a pushbutton to be pressed by a user), or upon detection of a predetermined pressure difference between an upstream pressure P1 and a downstream pressure P2. The controller 105 may further be configured to turn the filtration system 100 into a self-cleaning mode on periodic basis, e.g. upon counting a predetermined time interval T1 from a successful termination of a previous cleaning session, or upon counting a predetermined time interval T2 from an unsuccessful termination of a previous cleaning session, when the termination was recognized by the controller as resulting from inappropriate external conditions (e.g. occasional severe drop in the upstream pressure occurring during a cleaning session) and not as resulting from a failure of the self-cleaning mechanism.

The upstream pressure P1 is measurable, e.g. in a pressure sampling port t1 near the inlet 101i of the filtration chamber 102, in an inlet side of the screening element 103 (which is in fluid communication with the inlet 101i of the filtration chamber through the coarse screen 102), and may be communicated to the controller through line 105p1. The downstream pressure P2 is measurable in an outlet side of the screening element 103 (e.g. in a pressure sampling port t2 near the outlet 101e of the filtration chamber 102, connected to the controller through line 105p2).

In some embodiments of the presently disclosed subject matter, the controller 105 is configured to measure both said pressures by a pair of dedicated pressure gauges and to calculate the differential pressure. In some embodiments, the differential pressure is detected by a differential pressure gauge and the differential pressure alone is communicated to the controller. Regardless of the method by which the differential pressure is detected, the controller 105 may be configured to activate a self-cleaning session whenever the differential pressure exceeds a predetermined threshold value. The threshold may be indicative of filtride accumulated on the screening element 103 and reducing its open-area. As a result, when the threshold is met, self-cleaning session may be performed to improve the effectiveness of the screening element 103 after removing the filtride.

Upon activation of a self-cleaning session by turning the drain valve 118 open, the controller sends a switching command to the latch valve 115, and the latch valve disconnects the valve inlet 115f from and connects the valve inlet 115c to the valve outlet 115e, as shown by FIG. 1B.

In various embodiments of the presently disclosed subject matter, the fluid pressure supplied through the valve inlet 115c is open to the atmosphere, thus communicates atmospheric pressure to the inlet port of the cylinder 106c. The fluid pressure inside the draining compartment 111 is greater than atmospheric. As a result, the piston 106p starts moving in a direction away from the filtration chamber 101, into the cylinder 106c, as illustrated by FIG. 1B.

In various embodiments of the presently disclosed subject matter, the electronic controller is configured to delay the switching command of the latch valve 115, for a predetermined amount of time to be counted from the time of outputting the draining command that initiates the self-cleaning session by turning the drain valve 118 open. The delay may be optimized for allowing at least one full rotation of the suction scanner 104 before linear motion of the suction scanner begins, thereby providing for full extent cleaning of the screening element first end portion.

The pressure P3 in the end of cylinder 106c, is responsive to the motion of the piston 106p, since the motion of the piston presses against the fluidic content located in the cylinder 106c between the piston's first side and the cylinder's end (where the pressure P3 is monitored).

In various embodiments of the presently disclosed subject matter, the electronic controller 105 is programmed to calculate the current location of the piston with respect to the cylinder (which reflects the location of the suction scanner 104 with respect to the screening element 103), based on the current value of the pressure P3 as measured by a pressure gauge to which the pipe-line 107 is connected. An electronic signal indicative of the pressure value is outputted by the pressure-gauge to respective circuitry in the electronic controller.

In various embodiments of the presently disclosed subject matter, the controller is pre-programmed with the rate of evacuation of fluid out of the cylinder 106c per a given pressure P3 (or is pre-programmed with a table of positions of the piston as a function of time and of the pressure P3), thus may calculate (or determine) the position of the piston 106p, based on the actual pressure P3 and the lapse of time since switching the latch valve 115 to the self-cleaning mode.

In various embodiments of the presently disclosed subject matter, the same cylinder which constitutes a part of the location-tracker, is used also to control the linear motion of the suction scanner 104 with respect to the screening element 103. For example, in the illustrated embodiment, the location tracker 106 serves not only for tracking the linear motion of the suction scanner 104, but also to propel the linear motion. Moreover, in case the linear motion is faster than desired (as pre-programmed), the electronic controller may switch the latch valve 115 during the cleaning session for stopping the linear motion of the suction-scanner 104 several times during the self-cleaning session, while rotational motion of the suction scanner is maintained (by maintaining the drain valve 118 open).

In other various embodiments of the presently disclosed subject matter, the electronic controller is configured to identify when the pressure P1 has dropped below predetermined threshold value, for thereby identifying the piston stroke has been completed. In some exemplary embodiments, when the piston stroke is completed, i.e. the piston approached the end of its stroke and is the closest to the end 106e of the cylinder 106c, it ceases pressing the fluid residuals in the cylinder and the pressure in the cylinder may become equal to the atmospheric pressure communicated by the latch valve through the inlet port 115v. Said predetermined pressure value may be considered an identification that the suction scanner has completed its linear motion for a current self-cleaning session. In some exemplary embodiments, the predetermined pressure may be a pressure above the atmospheric pressure. For example, the predetermined pressure may be pressure indicative of the piston stroke nearing its completion, in which a relatively minor pressure is still applied.

As can be appreciated, the fluid accommodated within the cylinder 106c between the cylinder end 106e and the piston 106p is substantially isolated from the dynamics of fluid accommodated in the filtration chamber 101, thus allowing for noise-free tracking of the linear offset between the screening element 103 and the suction scanner 104, by monitoring the pressure P3. In various embodiments of the presently disclosed subject matter, the electronic-controller 105 is configured to use the monitoring of pressures P1 and P2 for supplemental calculations and for double-checking the location data revealed from the monitoring of P3. In some exemplary embodiments, the pressures monitored at P1 and P2 during the movement of suction scanner 104 may be affected by the cleaning process, and may thus not suffice for clearly and accurately signal that the cleaning process removed the filtride and the screening element 103 regained a desired effectiveness level. Using the monitored pressure of P3, such disadvantage of relying solely on P1 and P2 may be overcome.

FIG. 1C illustrates the position of the suction scanner 104 closely to the termination of a self-cleaning session, with the leftmost nozzle 104n situated in front the end portion 103e of the screening element, and with the main-tube's base axis 104a nearly fully withdrawn from the coarse filter 102. The piston 106c is full-stroke into the cylinder 106c, and the pressure P3 drops to the atmospheric pressure communicated to the cylinder from the inlet 115c of the latch valve 115. Upon recognition of such a change in the pressure P3, the electronic-controller 105 outputs a self-cleaning termination command, after a predetermined time-delay during which the suction scanner 104 may complete at least a single rotation, thereby guaranteeing full cleaning of the end band 103e of the screening element. The self-cleaning termination command include a shutting-signal communicated through electrical line 105d to the drain-valve 118, and a switching signal communicated through electrical line 105v to the latch valve 115. The high-pressure HP communicated to the cylinder 106c through the latch valve 115, drives the piston back, full-stroke remoter from the cylinder's end 106e, thereby resetting the system 100 to the position illustrated by FIG. 1A.

In various embodiments of the presently disclose subject matter, a single moving body (such as piston 106p) of a location tracker is commonly coupled to and is linearly comoving with a plurality of linearly moving parts of a respective plurality of suction scanners, which clean simultaneously a respective plurality of screening elements. The electronic controller 105 may thus receive a signal from a single location tracker, wherein said signal is indicative of the respective linear offset between a plurality of screening elements and a respective plurality of suction scanners. The electronic controller 105 may thereby be configured for terminating an ongoing cleaning session of a multi-screen filtration system, when a condition is met, similarly to the way it is configured for terminating the cleaning session of a single screening element. Likewise, the same electronic controller 105 may be configured to activate a cleaning session upon detection of a differential pressure exceeding a predetermined threshold value, between the upstream and the downstream of the multi-screen filtration system.

In some exemplary embodiments, the multi-screen filtration system may comprise a single hydraulic turbine and a gear to activate the plurality of suction scanner. Additionally, or alternatively, multiple turbines may be used, each to activate a corresponding suction scanner.

Figure 2A:
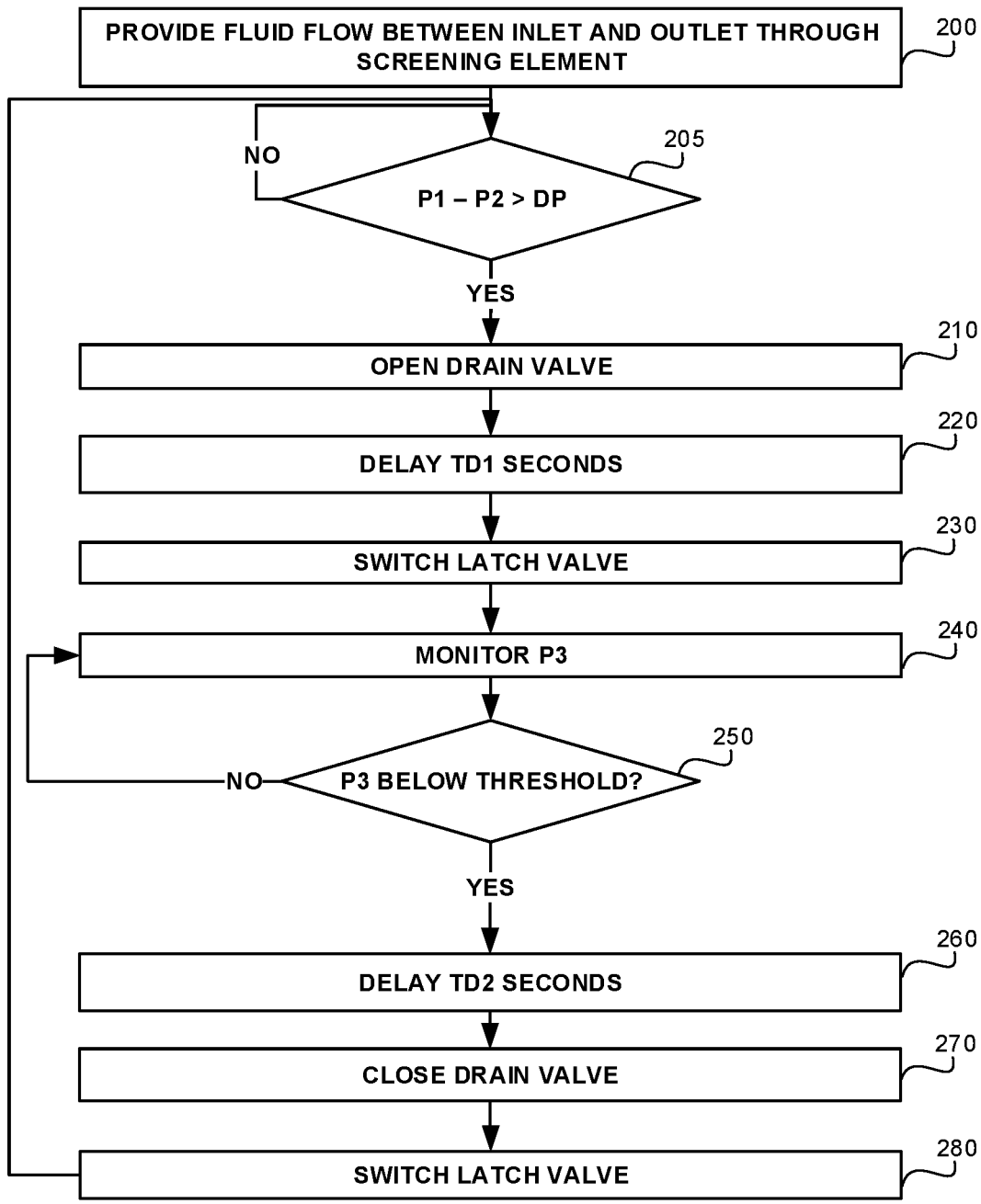
FIG. 2A shows a flowchart diagram of a method for performing self-cleaning, in accordance with some embodiments of the disclosed subject matter.

FIG. 2A shows a flowchart diagram of a method for performing filtration of a fluid by a screening element, self-cleaning of the screening element, and termination of the self-cleaning, in accordance with some exemplary embodiments of the disclosed subject matter.

At step 200, fluid flow between an inlet and an outlet of the filtration system is provided. The fluid flows through a screening element that filters the raw fluid received in the inlet and provides the treated fluid through the outlet. In some exemplary embodiments, a fluid flow is provided between the inlet 101i and the outlet 101e, through a screening element 103.

In some exemplary embodiments, a self-cleaning session is determined automatically, such as based on a detection of differential fluid pressure (205). Additionally, or alternatively, the self-cleaning session may be manually activated.

At Step 205, a pressure differential P1 minus P2 is monitored. P1 is the pressure value at or near a fluid inlet 101i of a filtration chamber 101 of the system. P2 is the pressure value at or near a fluid outlet 101e of the filtration chamber 101. When the differential pressure value DP exceeds a predetermined threshold, the system interprets the event as indicative of a too clogged screening member 103, requiring activation of a cleaning session to remove filtride and residue therefrom.

In various embodiments of the presently disclosed subject matter, the controller 105 of the filtration system may be configured to provide alerts, whenever the detection made in step 205 reveal a positive determination, or when the cleaning-session is in progress. The alerts may be provided, for example, in the form of a blinking LED light, a beeping sound, a text message appearing on the controller, a text message transmitted to a mobile device of an administrator of the controller, or the like.

At step 210, a drain valve 118 is turned on and opened. In some embodiments of the disclosed subject matter, the activation is automatic, such as using an electronically controlled drain. In other embodiments of the disclosed subject matter the activation is performed manually, e.g. by a user pressing a press-button causing the drain valve 118 to turn on.

Either of the inlet 101i and the outlet 101e may be shut, either automatically by the controller 105 or manually by a user, before or during the drain valve 118 is turned on in method step 210. For the self-cleaning steps starting with step 210, a pressurized fluid for the cleaning may be communicated to either the inlet 101i or the outlet 101e of the filtration chamber 101.

Once the drain valve 118 is turned on, a low (e.g. atmospheric) pressure is communicated through the drain valve to a drain port 116 of a draining compartment 111, and a portion of the fluid entering the inlet 101i of the filtration chamber, is thereby suctioned into one or more nozzles 104n of a suction scanner 104, which a main tube thereof 104m is opened at its end 104d to the draining compartment 111.

In some embodiments of the disclosed subject matter, the fluid flow outputted through the opening 104d of the suction scanner drives the rotation of a turbine 120 connected to the top end of the main tube 104m, thereby spinning the suction scanner 104 and making intake opening of the nozzles 104n scan the inner surface of the screening element 103 while suctioning fluid through the screen and filtride off its inner surface.

At step 220, a lapse of time since the previous step may be counted to cause a delay before proceeding with the next step 230. The counting of lapse of time may include a counting TD1 (Time Delay 1) between 0 and a predetermined number of seconds (e.g. between 0.5 and 5 seconds) depending on what desired portion of the cleaning session (corresponding to what approximate number of rotations) the suction scanner 104 is about to spend in spinning, before start moving linearly about the screening element 103.

Upon completion of counting TD1, step 230 may be performed.

At step 230, a latch valve 115 is switched for making the suction scanner 104 move linearly with respect to the screening element 103. The state of latch valve 115 may be switched to the position illustrated by FIG. 1B, which initiates the linear motion of the suction scanner 104, and the comoving of the piston 106p within the cylinder 106c.

At step 240, the pressure P3 near the end 106e of the cylinder 106c is monitored.

At step 250, a determination is made whether or not the value of P3 has reached a threshold value indicative of desired completion of the stroke of piston 106p within the cylinder 106c, which in turn may be indicative of completion of the linear motion of the suction scanner 104 with respect to the screening element 103.

Figure 2B:
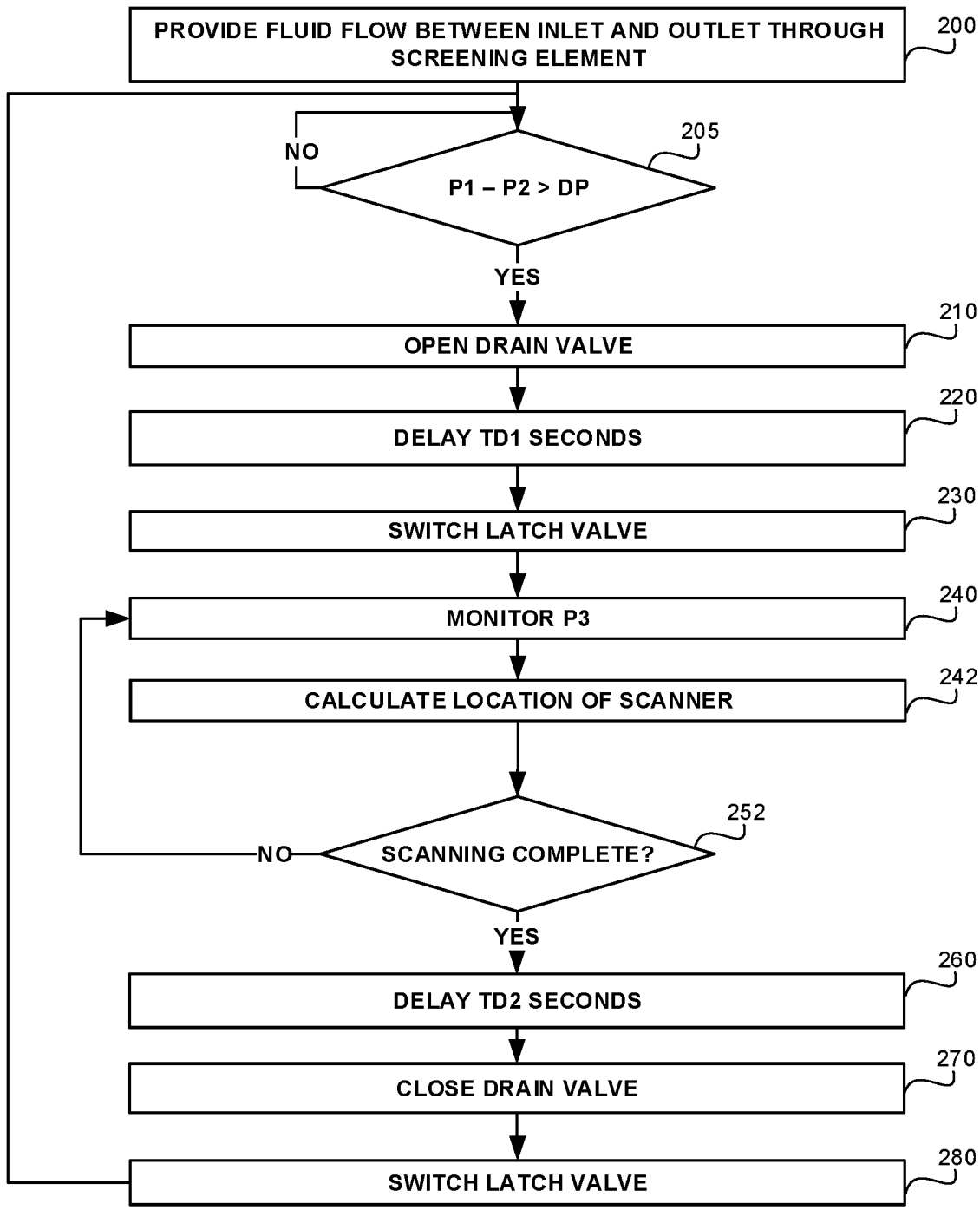
FIG. 2B shows a flowchart diagram of a method for performing self-cleaning, in accordance with some embodiments of the disclosed subject matter.

Additionally, or alternatively, as is exemplified in FIG. 2B, based on the monitored value of P3 (240), at step 242, a calculation may be performed. The calculation may estimate the relative linear location of the suction scanner 104 with respect to the screening element 103. The estimated location calculated in step 242 may be used in step 252 for determining whether the estimated location is the final desired location.

Once either P3 has reached the threshold value according to a first group of embodiments exemplified by FIG. 2A, or the calculation made in step 242 revealed in step 252 that the suction scanner 104 has reached its final linear position with respect to the screening element 103, according to a second group of embodiments exemplified by FIG. 2B, the method continues.

At step 260 a lapse of time TD2 (Time Delay 2) may be counted. The TD2 may be a time duration which the suction scanner may continue its spinning for a desired portion (between 0 and a predetermined number of seconds) of the cleaning session, before termination thereof in method steps 270 and 280. In various embodiments of the disclosed subject matter, the termination of the cleaning session may be achieved successfully regardless of the execution order between steps 270 and 280 (which may be performed also with step 280 preceding step 270, or with both executed simultaneously). The cleaning session is terminated by turning the drain valve 118 off, in method step 270, thereby shutting the fluid flow through the suction scanner 104. In step 280 the latch valve is switched back to its initial position, thereby resetting the system to a filtration mode of operation, and to step 205.

In various embodiments of the disclosed subject matter, a step of counting a lapse of a predetermined time before allowing activation of a next cleaning session based on the differential pressure between P1 and P2, may be included.

In various embodiments of the disclosed subject matter, method steps 250 and 252 (depending on the group of embodiments concerned), may include also counting a lapse of a predetermined time then skipping to step 260 (or to step 270), even in case P3 did not reach the threshold value (step 250) or in case the calculation (step 242) did not reveal that the suction scanner has reach its final position (step 252), e.g. due to a malfunctioning in the mechanism generating the respective motion between suction scanner 104 and the screening element 103.

In various embodiments of the presently disclosed subject matter, the monitoring of the pressure P3 is either accompanied or substituted by monitoring a signaling device that generate electrical output which corresponds to or allows to reveal by calculation the offset in position of a moving body. The moving body may be coupled to a moving part of the suction scanner such that the respective position of the suction scanner 104 with respect to the screening element 103 may be revealed based on the electrical output. In some embodiments of the presently disclosed subject matter the signaling device may include at least one photosensor for optically determining whether the moving body has reached a predetermined location (the photosensor, e.g. a photovoltaic cell may be configured to respond to changes in the illumination of a light emitting diode when a sightline between the photodiode and the LED is crossed by the moving body). In some embodiments the signaling device may include at least one actuator, e.g. an electrical switch, to be contacted by the moving body when the moving body has reached a predetermined location. In some embodiments the signaling device may include at least one electric-field (e.g. capacitance) sensor or magnetic field (e.g. induction) sensor for determining whether the moving body has reached the predetermined location, based on variation in capacitance, in inductivity, or in an electrical current or voltage, resulting from the changing distance between a moving body comprising or constituting a first member of the related sensor and between a stationary element constituting a second member of the related sensor.

The calculation in step 242, and the determinations made in steps 250 and 252, may thus be performed taking account of the signal generated by the signaling device.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The flowchart in the figures illustrate the architecture, functionality, and operation of possible implementations of systems, methods, and products according to various embodiments of the present disclosed subject matter. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

The invention claimed is:

1. A filtration system (100) comprising:
   a filtration chamber (101);
   an environment (106c) isolated from fluid content of the filtration chamber (101);
   a screening element (103) located within the filtration chamber (101);
   a suction scanner (104) for self-cleaning the screening element (103) by suctioning fluid through the screening element (103) upon activation of a self-cleaning session;
   a location tracker (106) that comprises a moving body (106p) coupled to the suction scanner (104), wherein the moving body (106p) is linearly movable within the environment (106c);
   at least one pressure detector for detecting a change in a pressure within the environment (106c) resulting from the moving body (106p) moving linearly within the environment (106c) during the self-cleaning session;
   an electronic controller (105) configured to terminate the self-cleaning session;
   wherein during the self-cleaning session, the suction scanner (104) moves linearly across the screening element (103), thereby cleaning the screening element (103) and causing the moving body (106p) to move linearly within the environment (106c);
   wherein upon the moving body (106p) reaching a predetermined location in the environment (106c), the location tracker (106) communicates a signal based on an output of the pressure detector to the electronic controller (105), wherein said signal is indicative of the suction scanner (104) completing a linear motion within the filtration chamber (101); and
   wherein the electronic controller (105) determines whether to terminate the self-cleaning session based on said signal.

2. The filtration system (100) according to claim 1, wherein the environment (106c) is outside the filtration chamber (101).

3. The filtration system (100) according to claim 1, wherein the moving body (106p) comprises a piston that is linearly movable within the environment (106c), wherein the environment (106c) is defined by a cylinder.

4. The filtration system (100) according to claim 1, wherein the environment (106c) is coupled to a fluid source for filling the environment (106c) with a predetermined amount of fluid prior to the activation of the self-cleaning session.

5. The filtration system (100) according to claim 1, wherein the electronic controller (105) comprises an input terminal (108) in communication with an output of the pressure detector, wherein communicating the signal to the electronic controller (105) comprises communicating the output of the pressure detector to the electronic controller (105).

6. The filtration system (100) according to claim 5, wherein the electronic controller (105) further comprises second and third input terminals (105p1, 105p2), wherein the second input terminal (105p1) is in communication with an output of a first additional pressure sensor (t1) configured to monitor a pressure of unfiltered fluid entering the filtration chamber (101), wherein the third input terminal (105p2) is in communication with an output of a second additional pressure sensor (t2) configured to monitor a pressure of filtered fluid exiting the filtration chamber (101).

7. The filtration system (100) according to claim 6, wherein the electronic controller (105) is configured to monitor the differential pressure between the pressure monitored by the first pressure sensor (t1) and the pressure monitored by the second pressure sensor (t2), to initiate the self-cleaning session after the differential pressure has exceeded a predetermined threshold value, and to terminate the self-cleaning session upon detection of an expected change in the output of the pressure detector.

* * * * *